(12) United States Patent
Fernandez

(10) Patent No.: US 8,064,505 B2
(45) Date of Patent: *Nov. 22, 2011

(54) SYSTEM AND METHOD FOR DYNAMIC ALLOCATION OF SPECTRUM

(75) Inventor: Jose Fernandez, Sunrise, FL (US)

(73) Assignee: Global Communications, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/939,525

(22) Filed: Nov. 4, 2010

(65) Prior Publication Data

US 2011/0051679 A1 Mar. 3, 2011

Related U.S. Application Data

(63) Continuation of application No. 11/695,644, filed on Apr. 3, 2007, now Pat. No. 7,848,398.

(60) Provisional application No. 60/744,195, filed on Apr. 3, 2006, provisional application No. 60/744,274, filed on Apr. 4, 2006.

(51) Int. Cl.
*H04L 5/16* (2006.01)

(52) U.S. Cl. ...................................................... 375/222

(58) Field of Classification Search ................... 375/222, 375/260, 219; 725/118, 121, 126; 348/12, 348/13, 17, 25
See application file for complete search history.

(56) References Cited

U.S. PATENT DOCUMENTS

| | | | |
|---|---|---|---|
| 6,516,352 B1 | 2/2003 | Booth et al. | |
| 7,489,732 B2 | 2/2009 | Cheng | |
| 7,848,398 B2 * | 12/2010 | Fernandez | 375/222 |
| 2005/0238113 A1 | 10/2005 | Santhoff et al. | |
| 2007/0217414 A1 | 9/2007 | Berkman et al. | |
| 2008/0268838 A1 | 10/2008 | Zufall et al. | |

OTHER PUBLICATIONS

Office Action dated Oct. 4, 2010, from co-pending U.S. Appl. No. 12/512,003, filed Jul. 29, 2009.
International Search Report for co-pending PCT Application No. PCT/US10/33163 dated Jul. 13, 2010.

* cited by examiner

*Primary Examiner* — Khai Tran
(74) *Attorney, Agent, or Firm* — Bracewell & Giuliani LLP (57) ABSTRACT

A communication system is provided for transmitting video, audio, and data content between two or more nodes of a communications network comprised party of twisted pair links. Also provided, is a telecommunication system for transmitting spectrum, comprising transmission bandwidths that carry signals such as, video, audio, data and other services, over twisted pairs of telephone wires. Such system being adapted for dynamic assignment and management of frequency bands of spectrum over twisted pair links.

21 Claims, 4 Drawing Sheets

SYSTEM AND METHOD FOR DYNAMIC ALLOCATION OF SPECTRUM

CROSS-REFERENCE TO RELATED APPLICATIONS

This application is a continuation of U.S. patent application Ser. No. 11/695,644 filed Apr. 3, 2007 which claims priority and benefit of U.S. Provisional Applications Ser. Nos. 60/744,195 filed Apr. 3, 2006 and 60/744,274 filed Apr. 4, 2006, the contents of which are both hereby incorporated by reference in their entirety.

TECHNICAL FIELD

One aspect of this invention relates in general to a telecommunication system for transmitting over a frequency spectrum, comprising transmission bandwidths that carry signals such as, video, audio, data and other services, over twisted pairs of telephone wires. The system further provides for the dynamic assignment and management of frequency bands of spectrum over twisted pair telephone wires.

BACKGROUND OF THE INVENTION

An issue that often arises in communication systems is maintaining sufficient transmission bandwidth to satisfy quality of service ("QoS") requirements. These challenges are accentuated in instances where unshielded twisted pairs telephone lines ("twisted pair links") are employed in such systems. Moreover, such signals rapidly degrade when transmitted over a twisted pair links of meaningful length. However, given the existence of twisted pair links in many buildings and communication networks and the cost associated with alternative links and/or retrofitting existing twisted pair links with alternative links, it is desirable to transmit such signals over twisted pair links for a variety of applications, including video communication systems. Accordingly, there is a need for a system that provides a means to use twisted pair links for high data bandwidth applications.

Such need is fueled, in part, by the recent explosion in demand for full real time motion video, high resolution images, and defined quality of services that have also ignited heretofore inexperienced demand for broadband spectrums. While existing phone systems nominally pass voice signals between 0.3 and 3.4 kHz, twisted pair links are capable of carrying frequencies well beyond such 3.4 kHz upper limit. In certain twisted pair links, the upper limit can be tens of megahertz, depending on the length and quality of the wire.

Previously and currently known technologies have attempted to quench demands with near broadband services, such as DSL and related technologies, which provide digital data transmission over the wires of a local telephone network. However, DSL employs a "fixed" frequency allocation according to DSL provider specifications. For example, DSL allocates a finite set of frequency bands for uplink and downlink above the 3.4 kHz upper limit. Another problem with DSL is that signals passing over twisted pair links deteriorate rapidly and unevenly across frequency spectrum with increasing length of the twisted pair communication wire.

Other previously and currently known technologies employ fully digital services, such as E1/T1, in an attempt to satisfy the aforementioned demands for bandwidth. However, fully digital services are often cost prohibitive in that they often require additional voltage, wiring, and special equipment at each end of the line and line, and conditioning to prepare for digital only service.

There has not heretofore been employed a cost effective and efficient method and apparatus for dynamically allocating frequency to meet the above and other needs. Moreover, there has not heretofore been employed a technology that provides for high bandwidth transmissions over twisted pair links presently forming the backbone of the local telephone infrastructure in the United States other countries.

BRIEF SUMMARY OF THE INVENTION

The present invention includes multiple objectives and methods and apparatus for satisfying same. The appended claims are directed to certain of such objectives, methods, and apparatus.

It is an object of the present invention to provide improvements that provide satisfactory transmission bandwidth for video, audio, and data applications over communication links, including links that use unshielded twisted pairs.

A further object of the present invention is to provide a method and apparatus that provides sufficient transmission bandwidth over twisted pair links, where such twisted pair links span distances typically found in building and/or last mile applications.

An even further object of the invention is to employ a converter means that interconnects twisted pair links with digital data processing devices. Preferably, such converter also interconnects such devices with a plurality of alternative carriers such as optical, T1 and wireless links. As such, a digital to analog ("D/A") or analog to digital ("A/D") converter 150 is employed. The converter 150 is configured to accept a digital signal and convert it to analog, or vice versa.

Another object of the invention optimizes transmission bandwidth between multiple nodes. The nodes may be configured with and employ means for modulating an analog carrier signal over twisted pair links at, preferably, high frequency bandwidths. Each node may be configured with and employ means for demodulating analog carrier signals to decode the transmitted information.

Another object of the invention is to enable high transmission bandwidths over a significant distance of twisted pair links by employing corrective circuitry. As such, corrective circuitry is operably coupled to the twisted pair links. Upon receipt of an analog signal, the circuitry is configured to ameliorate degradation in the received signal by imposing correcting impedance associated with the twisted pair link.

Another object of the present invention to provide improvements that provide satisfactory transmission bandwidth by dynamically assigning frequency bands for transmission over twisted pair links operably coupled with correcting circuitry.

To achieve some of the foregoing objectives, there is provided central premise equipment ("CPE") 100 in home and office locations with correcting circuitry. CPE 100 operates independent of, and/or in combination with, previously deployed central office and manhole correcting circuitry. The term communications device, as used herein, is used broadly and may incorporate one or more than one CPE 100, which may be configured with a variety of functionality, including all or a portion of equipment illustrated in FIG. 1. For example, by employing the automatic corrective circuitry, CPE 100 maintains all available bandwidths between remote CPEs 100 and/or a central office hub (not shown). This capability allows broadband signals to be transmitted over significant lengths while meeting aforementioned bandwidth and other demands.

The present invention further improves upon current and previously known technologies by deploying a frequency management module ("FMM") 300 in CPE 100. FMM 300 is preferably an operating system independent software application configured to receive an analog signal and dynamically manage and assign new frequency spectrum for video, audio, data and other services. Upon receiving such signals, FMM 300 dynamically allocates a new frequency for the signal based upon frequency configuration settings known to or determined by FMM 300. FMM 300 also causes the signal to modulate over a communications link at a newly allocated frequency. The spectral range of the newly allocated frequency is selectively or automatically chosen by FMM 300 based on the type of service(s), gauge, length and quality of the outgoing twisted pair link. Thus, the present invention provides a means to create and manage more usable channels, which equates to more available bandwidth.

By way of example, the present invention enables a user to employ FMM 300 as an alternative to using the Internet to upload a large document using File Transfer Protocol ("FTP"), a process that may take a great deal of time using presently known technologies. FMM 300 may allocate a band of new frequencies and transmit the document information by modulating a frequency or frequencies in such band over twisted pair links to a remote CPE 100. Upon receipt of the signal, the remote CPE 100 employs correcting circuitry to reconstruct any signal degradation. Furthermore, if the signal is addressed to the receiving CPE 100, FMM 300 resolves frequency information to recover the uploaded document. If the signal is not addressed to the receiving CPE 100, FMM 300 reallocates the compensated signal into a new spectrum for further transmission along twisted pair links.

To achieve the foregoing objects including high bandwidth transmission and reception, one aspect of the invention employs a CPE 100 device having a transmitter, receiver, compensator, and FMM 300. The transmitter modulates analog signals in a newly assigned frequency spectrum over a twisted pair links. The receiver decodes a received analog signal from frequency spectrum. The compensator corrects signal degradation resulting from the physical properties of the twisted pair. FMM 300 preferably allocates frequency spectrums from 0 to preferably 20 megahertz for transmission of signals and manages signals of the same frequency.

In another aspect of the invention, the present invention deploys more than one CPE 100 devices. Each CPE 100 is operably configured with a transmitter 120 for transmitting signals in an analog format over an assigned frequency spectrum. Each CPE 100 also has a receiver for receiving signals in an analog format over an assigned frequency spectrum on a twisted pair link. Furthermore, each CPE 100 uses a FMM 300 to assign discrete bands of frequency spectrum for different communication signals such as video, voice, and data.

In a further aspect of the invention, FMM 300 automatically assigns compensation factors to the correcting circuitry. FMM 300 computes compensation factors based upon known or computed impedance quantums associated with a twisted pair link. However, users and/or administrators can also input compensation factors via a graphical user interface. Control signals may also update FMM 300 with compensation factors. CPEs 100 operated by administrators transmit control signals to client CPEs 100 when the client CPE 100 is first configured.

Upon receiving a compensated signal, FMM 300 dynamically allocates and reallocates frequency spectra for the received signals according to data transmission requirements and communication protocols including, for example, TCPIIP, NTSC, High-definition television ("HDTV"), Séquentiel Couleur à Mémoire ("SÉCAM"), Phase Alternating Line ("PAL"), Session Initiation Protocol ("SIP"), etc. A protocol manager in FMM 300 may store and selectively retrieve the rules associated with each of such transmission requirements and communication protocols when allocating new spectrum. The protocol manager may also provide for simultaneous support of each of such requirements and protocols when allocating new spectrum.

A system thus may employ the foregoing unique combination including the combination of dynamic frequency allocation and correcting circuitry for twisted pair links to take advantage of all available bandwidths for signal transmissions. More particularly, the system provides a combination of means for compensating signal degradation, and means for dynamically allocating frequencies and enabling high bandwidth signals for transmission over great spans of twisted pair links.

The foregoing has broadly outlined certain objectives, features, and technical advantages of the present invention in order that the detailed description of the invention that follows may be better understood. Additional features and advantages of the invention are described hereinafter, which form the subject of certain claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages is better understood from the following description when considered in connection with the accompanying figures. It is to be expressly understood, however, that such description and figures are provided for the purpose of illustration and description only and are not intended as a definition of the limits of the present invention. For example, although the example embodiments discussed herein are directed to communication, security and home office subsystems, it should be specifically noted that frequency allocation means, correcting circuitry means, as defined herein, may be employed to carry out the functions of several other subsystem applications including, without limitation, fire, safety, heating, ventilation and air conditioning, television, access controls, audio visual, plant equipment, communications, robotics, imaging, and medical sensor systems.

DETAILED DESCRIPTION OF THE INVENTION

The present invention provides an improved telecommunication system, improved components of such a system, and improved transmission bandwidth for video, audio, and data content exchange. In contrast to known systems, the present invention expands the usefulness of existing and more economically desirable communication links, such as twisted pair links. Moreover, the present invention provides methods that expand the usefulness of such links. While the preferred embodiment is explained in the context of twisted pair links, one of ordinary skill would appreciate that the invention may utilize alternative links such as shielded twisted pair, screened shielded twisted pair, and screened unshielded twisted pair (and any other variant of a twisted pair).

The improved telecommunication system is discussed in detail below including dynamic allocation of spectrum, command and control systems, and specific embodiments of such improvements.

Dynamic Allocation of Spectrum

As noted above, an object of the present invention is to provide an improved system for regenerating degraded signals and dynamically allocating new frequency bands for specific categories of communication signals to enable high bandwidth transmissions over twisted pair links. As such, corrective circuitry 130 and FMM 300 are deployed in one embodiment of the present invention.

In general, corrective circuitry 130 and FMM 300 are operably coupled within a single device, referred to hereinafter as the Central Premise Equipment 100. Reference is made below to CPE 100.

Central Premise Equipment 100

CPE 100 may be deployed as an electronic set top box positioned within a home, office building, central office, or other remote facility accessible to system users or administrators. CPE 100 employs corrective circuitry 130 in order to reconstruct degraded signals received over twisted pair links. CPE 100 also employs FMM 300 in order to make use of available transmission bandwidth on twisted pair links by dynamically allocating frequency bands for use by specific categories of communication signals, preferably, ranging from 0 to 20 megahertz. In one embodiment, FMM 300 dynamically allocates frequency bands of at least 4.5 megahertz.

CPE 100 comprises an analog section and a digital section. The analog section includes input and output poles for twisted pair links, corrective circuitry 130, and one or more buffers 140. The digital section includes of one or more converters 150, WAN 230 and/or LAN 240, microprocessors 160 adopted to provide FMM 300 functionality, and serial ports 170. Reference to the analog and digital sections and its components is made below.

Analog Section

Figure 1:
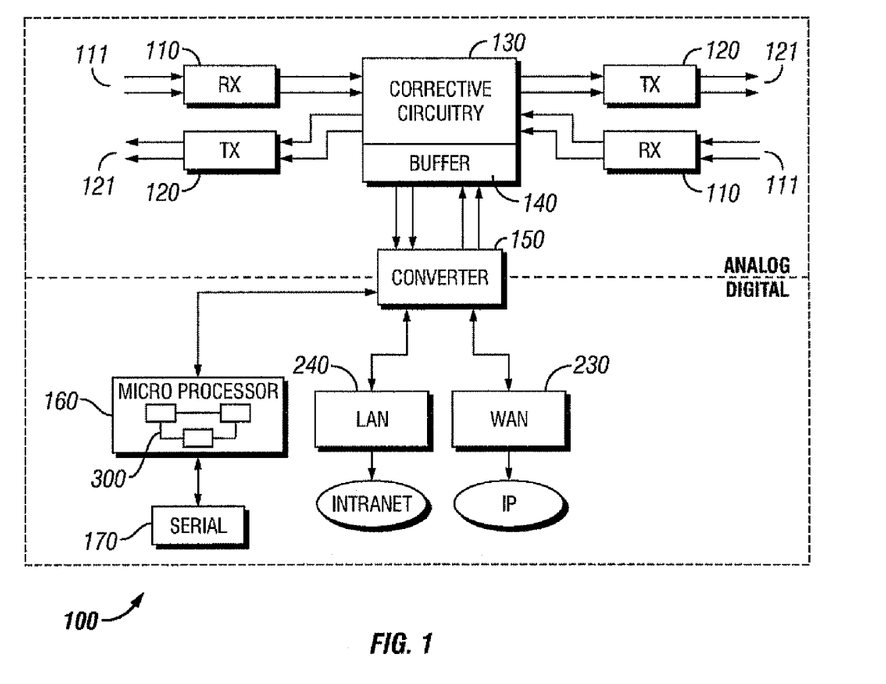
FIG. 1 illustrates a first exemplary architecture of a CPE.

As illustrated in FIG. 1, the analog section of CPE 100 includes a physical interface for connecting CPE 100 to the local telephone network's twisted pair infrastructure. The physical interface may be an RJ11 port or other link suitable for terminating CPE 100 and twisted pair telephone infrastructure, including RJ14, RJ25, RJ61, and others. Preferably, the physical interface provides coupling of more than one twisted pair link. Each twisted pair link provides a channel for transmitting electric signals. Each twisted pair link comprises a receiver 110 and transmitter 120. Receiver 110 is interconnected, respectively, with wires 111. Similarly, transmitter 120 is interconnected, respectively, with wires 121. By way of example, preferably a plurality of wires 111 and 112 may be bundled together in Channels 200. Receiver 110 and transmitter 120 may be optionally coupled as a single transceiver, such transceiver preferably receives two wire twisted pair, one wire used for transmission, and one wire used for reception.

Analog signals are received by CPE 100 on the receiver 100 and transmitted out from CPE 100 on transmitter 120. Upon receiving a signal over the physical interface, CPE 100 reconstructs the original information in the signal. CPE 100 employs correcting circuitry 130 in order to reconstruct degraded signals received over twisted pair links. Corrective circuitry 130 is described in the next section.

Corrective Circuitry 130

Preferred embodiments of the improved telecommunication system employ corrective circuitry 130 to compensate for degradation of analog signal in twisted pair links to enable high bandwidth transmissions over great spans of such links. In general, corrective circuitry 130 operably couples with twisted pair links which presently form the backbone of telephone systems in the United States and many other countries. Corrective circuitry 130 enables transmission of frequencies ranging from 0 to 20 megahertz over distances of 6,000 feet over unshielded twisted pair links without repeaters.

Corrective circuitry 130 of the preferred embodiment enables simultaneous and bidirectional transmission of signals over twisted pair links. The circuitry also supports both high bandwidth analog and digital signal transmission and reception, including full motion color video with voice and/or data content. Corrective circuitry 130 also accommodates full duplex video channels and additional voice grade channels over the twisted pair link. Corrective circuitry 130 provides an effective alternative for the transmission of high bandwidth analog signals wherever twisted pair links exist, without the need for installation of new communication link infrastructure and expensive line condition equipment.

Operation of corrective circuitry 130 reconstructs degraded signals received over a twisted pair link. Signal degradation is the loss of quality of an electronic signal, caused by several factors in the time domain and in the physical domain of an electronic signal, including drift, crosstalk, and aging effect. Corrective circuitry 130 of the present invention employs means to achieve desired circuit characteristics, such as matched transmission levels, matched impedances, and equalization for changing the frequency envelope of a sound. Corrective circuitry 130 may also employ means to improve data transmission, such as equalization of the insertion-loss-vs.-frequency characteristic. When twisted pair links do not employ the aforementioned corrective circuitry 130 means, electrical signals deteriorate as they pass over distances of the twisted pair link and information carried by such signals is not reliably reconstructed.

Examples of corrective circuitry 130 are described in U.S. Pat. Nos. 5,528,286, 5,283,637, and 6,064,422, which are hereby incorporated by reference in their entirety. Examples of corrective circuitry 130 are described in the '286 and '637 patents in columns 11-18 and is further described in the '422 patent in columns 8-10.

An example of corrective circuitry 130 employed in one embodiment of the present invention compensates for the impedance of a twisted pair link. Such corrective circuitry amplifies and impedance matches analog signal on a twisted pair wire. Portions of the corrective circuit 130 provide offsetting impedance to the received analog signal. Such offsetting or compensating impedance is preferably proportional and in vector opposition to the impedance of the twisted pair link to negate the effects of the impedance on the signal. Preferably, corrective circuitry 130 dynamically matches such impedance, without the need for operator intervention. The output signal from corrective circuitry 130 is a reconstructed analog signal.

Another example of corrective circuitry 130 employed by the invention measures the attenuation of lower frequency components of the signal to compute the length of the twisted pair link over which the received signal was traveled. The corrective circuitry 130 also compares the low frequency components of the received attenuated signal with the known signal level to compute a compensation factor. Corrective circuitry 130 applies greater signal amplification in higher frequency portions than in the lower frequency portions due to greater loss occurring in higher frequency portions of the twisted pair. The signal is thereupon reconstructed.

The aforementioned circuitry provides a non-exhaustive list of exemplary corrective circuitry 130 that operably couples to the twisted pair for reconstructing a received degraded analog signal, as shown in FIG. 1. Corrective circuitry 130 optionally couples with a switching network 210, which is discussed in the next section.

Switching Network 210

Figure 2:
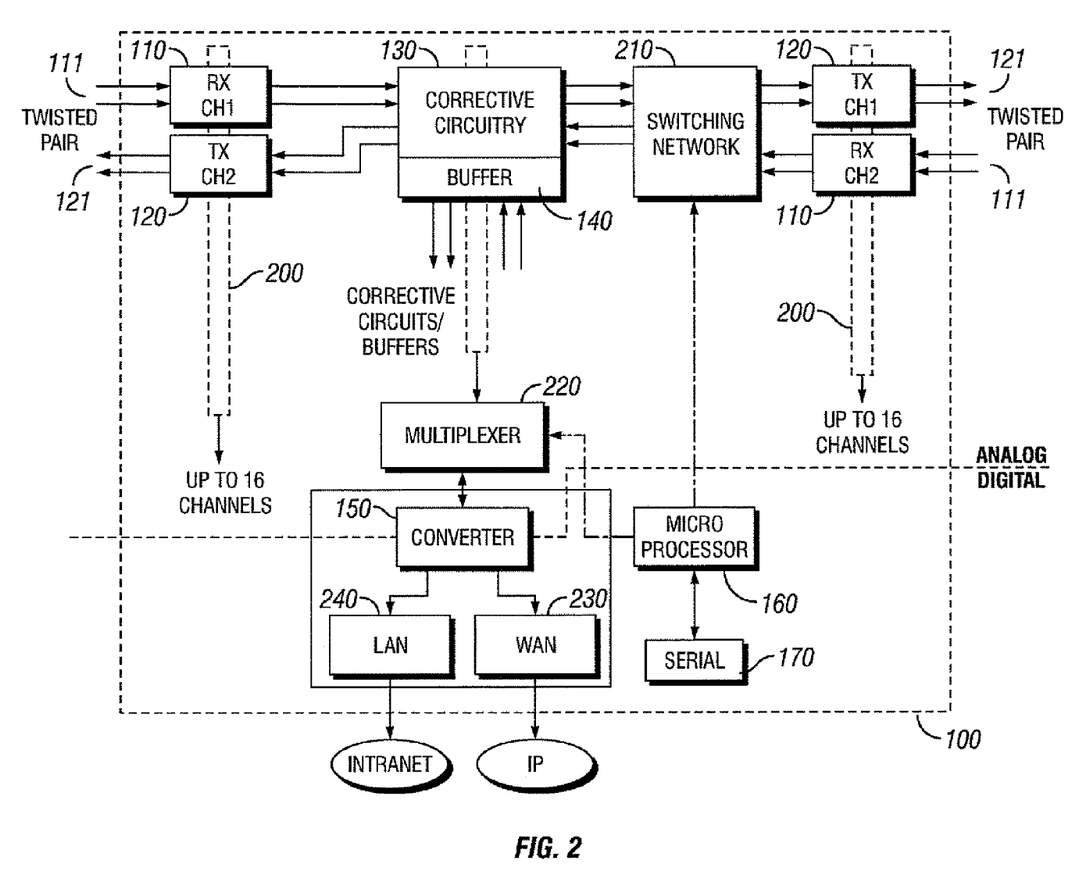
FIG. 2 illustrates a second exemplary architecture of a CPE.

In one embodiment, a switching network 210 terminates receiver 110 and transceiver 120 with corrective circuitry 130. As shown in FIG. 2, one embodiment of switching network 210 connects as many 16 channels 200 of receivers 110 and transmitters 120. Switching network 210 enables CPE 100 to send and/or receive signals at any given time. Switching network 210 enables CPE 100 to employ different mediums of networking, including optical, laser, Ethernet, Fiber, ATM, and 802.11. By way of example, switching network 210 may receive/transmit information signals on twisted pair links and transmit/receive such information signals over alternative mediums of networks.

In addition, switching network 210 may be coupled with microprocessor 160 so that a received signal can be treated by FMM 300, which is shown within microprocessor 160. By way of example, switching network 210 may provide commands to FMM 300 that define frequency allocation. Switching network 210 also receives analog signals from the digital section's converter 150 upon demodulation of spectrum over the physical interface.

As illustrated in FIG. 2, switching network 210 is operably coupled to corrective circuitry 130 (described above), to enable transmission of frequencies of desired bandwidths over twisted pair links connected with switching network 210. As shown in FIG. 2, buffer or isolation means 140 interconnects corrective circuitry 130 with converter 150 and microprocessor 160 which includes FMM 300. Buffer 140 is described in the following section.

Buffers 140

Buffer 140 is an electrical component, such as a circuit, that isolates corrective circuitry 130 from converter 150. Buffer 140 is located between corrective circuitry 130 and converter 150 and is used to interconnect the two components.

Buffer 140 is optionally a flow control means for delaying the transit time of a signal in order to allow operations in converter 150 to occur. Electronic temporary storage means in buffer 140 store the signal for a period of time as it passes from corrective circuitry 130 to converter 150, (alternatively through multiplexer 220) as such components may have different speeds for handling and/or processing signals. Buffer 140 retransmits a stored signal at approximately the rate converter 150 demodulates the signal. Buffer 140 is optionally coupled with multiplexer 220, which is discussed below.

Multiplexer 220

As shown in FIG. 2, multiplexer 220 is adopted to receive signals from any of buffers 140 and/or converter 150 and select among available twisted pair link transmitters 120 for transmission of analog signals. Multiplexer 220, shown operably coupled to microprocessor 160, selects among available twisted pair transmitters 120 and receivers 110 of channels 200 when transmitting and receiving analog signals. Multiplexer 220 selects among such channels 200 based upon input from microprocessor 160. For example, upon receiving a signal from buffer 140 over selected first receiver 100 of channels 200, multiplexer 220 transmits the signal to converter 150. Converter 150 thereupon transmits the signal to microprocessor 160, which processes the signal with FMM 300 (further discussed below). Microprocessor 160 then selects a second transmitter 120 from one of the available transmitters 120 in channels 200 and configures multiplexer 220 to transmit the analog signal over the second transmitter 120. Microprocessor 160 transmits the signal back to converter 150, which thereupon transmits the signal back to multiplexer 220. Now configured, multiplexer 220 transmits the signal over the selected second transmitter 120.

Multiplexer 220 operably couples with the converter 150, which is part of CPE's 100 digital section. Reference to the digital section and its components are made in the following sections.

Digital Section

The typical components and architecture of the digital section are discussed herebelow including: converter 150, WAN 230 and LAN 240, microprocessor 160, and FMM 300.

Converter 150

Similar to a traditional modem, converter 150 interconnects analog twisted pair links with digital data processing devices. As such, converter 150 handles both incoming and outgoing transmissions. Converter 150 also sends and receives digital signals to and from microprocessor 160.

When transmitting digital signals, converter 150 employs techniques to encode the digital bits into analog signals based upon specified protocols. The protocols are either preset, automatically, or manually specified. The protocols define the methods of encoding and the data transfer speed. The converter 150 supports a plurality of protocols, such as TCP/IP.

CPEs 100 establish connections with one another based upon common protocols. CPEs 100 also employ proprietary protocols so that only CPEs 100 supporting the same proprietary protocol can establish connections.

When an analog signal is received at converter 150 on a twisted pair link, converter 150 demodulates the signal into digital signals for further treatment by microprocessor 160 and FMM 300. Converter 150 also receives digital signals over WAN 230 and LAN 240. Upon receiving digital signals from the connected WAN 230 and LAN 240 networks, converter 150 also forwards the signals to microprocessor 160. WAN 230 and LAN 240 networks support Ethernet connections.

In another embodiment, converter 150 is adopted to receive an optical signal over a fiber optical cable (not shown). Upon receiving such a signal, converter 150 thereupon converts such signal into a digital format for treatment by microprocessor 160. One example of a means for converting optical signal to a digital signal format is a transponder (not shown). Transponders are adopted to receive an optical signal and convert such signal into an analog format and, following such conversion, convert the analog signal into a digital format.

WAN 230 and LAN 240

As shown in FIG. 1, converter 150 receives digital signals over WAN 230 and LAN 240. LAN 240 and WAN 230 support the IEEE 802.3 standard (e.g. the Ethernet protocol). WAN 230 and LAN 240 connect CPE 100 through a Uniform Serial Bus ("USB"), twisted pair, coaxial cable, serial, parallel or other suitable physical interface. Accordingly, CPE 100 supports Carlier Sense Multiple Access with Collision Detection ("CSMA/CD") Media Access Control ("MAC"), so that CPE 100 can interoperate with interconnected nodes of WAN 230 or LAN 240.

Depending upon the information in the signal, such as the target recipient's address, microprocessor 160 causes a signal from LAN 240 or WAN 230 to transmit or retransmit over the twisted pair links of the telephone infrastructure. Microprocessor 160 is discussed below.

Microprocessor 160

Microprocessor 160 receives digital signals from converter 150. Microprocessor 160 is a programmable digital electronic component that functions as a central processing unit ("CPU") for CPE 100. Upon receiving a signal, microprocessor 160 performs FMM 300 functionality.

In one embodiment, microprocessor 160 selects transmitters 120 and receivers 110 from one of the available transmission 120 and receivers 110 in channels 200 and configures multiplexer 220 to transmit and receive signals based upon such selection.

Frequency Management Module—FMM 300

Figure 3:
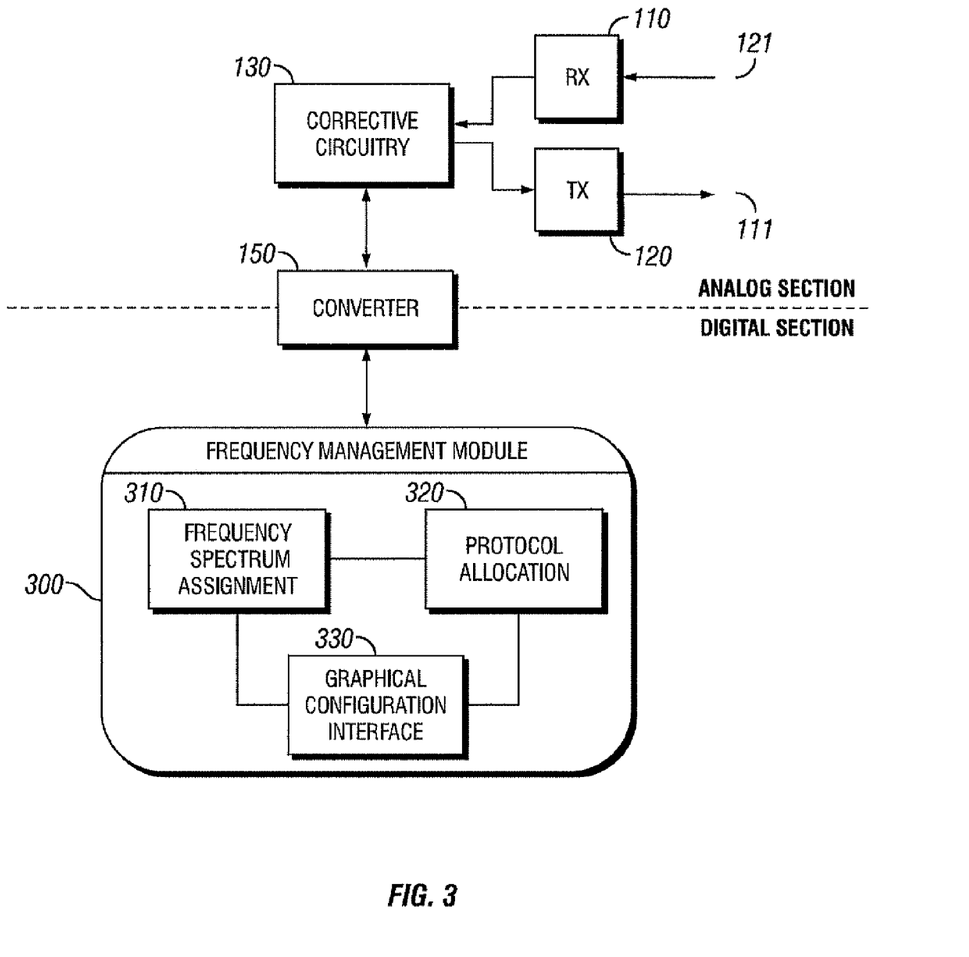
FIG. 3 illustrates an exemplary architecture of an expanded view of the dynamic allocation of spectrum means that may be used by a CPE.

As illustrated in FIG. 3, FMM 300 consists of three logical blocks: Frequency Spectrum Assignment ("FSA") 310, Protocol Allocation ("PA") 320, and Graphical Configuration Interface ("CGI") 330.

In general, FMM 300 is software preferably residing on the application layer of an operating system. FMM 300 is preferably interoperable with a variety of operating systems, such as Linux and Windows CE. In addition, FMM 300 assigns frequency according to configuration instructions provided to CPE 100. Users and network administrators dynamically control CPE 100 and supply configuration information to manage spectrum usage in a way that optimizes available bandwidth over twisted pair links depending upon the range a signal will travel over twisted pair, the physical properties of twisted pair, and service demands of each user.

Frequency Spectrum Assignment 310

As illustrated in FIG. 3, FSA 310 is a sub-module of FMM 300. An object of this sub-module is to allocate discrete frequency bands, such as those in FIG. 4. Another object of the spectrum assignment block is to provide compensation factors to corrective circuitry 130. A further object of FSA 310 is to control the range of frequencies allocated in the spectrum to various video 450, audio 430, and data 460 signals, among others.

Figure 4:
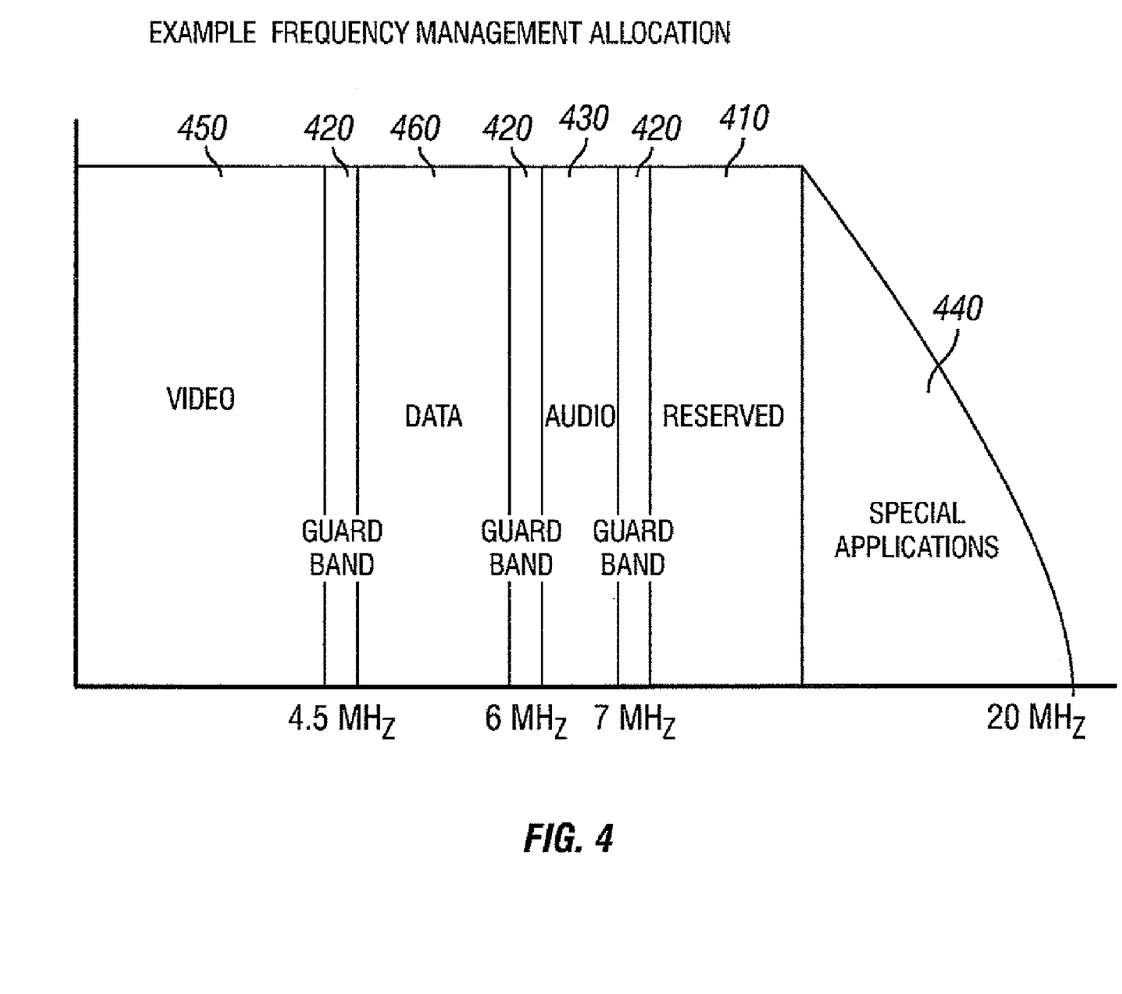
FIG. 4 illustrates an exemplary frequency management allocation.

Accordingly, based upon CPE's 100 spectrum assignment settings of 0 to 20 megahertz, as shown in FIG. 4, FSA 310 assigns service categories into discrete frequency bands. Control signals are employed to initially configure frequency allocation assignments for service categories. Control signals define routing table information so that the signals reach the targeted recipient.

In an example embodiment, control signals are transmitted over a channel in reserved band 410. An example control signal specifies video signal for broadcast in video band 410 ranging from 0 to 4.5 megahertz. Once assigned, FSA 310 directs converter 150 to modulate NTSC signals over the twisted pair link in the specified frequency range. In instances when multiple CPEs 100 exist remotely from one another, at least one of such remote CPEs 100 receives the newly allocated spectrum and demodulates such spectrum at the specified frequencies to resolve NTSC frequency information.

In another example embodiment, channels reserved for specific protocol are assigned frequencies in reserved band 410. FIG. 4 illustrates reserved band 410 ranging from approximately 7.5 megahertz to 9 megahertz. FIG. 4 also illustrates guardband 420 between reserved band 410 and audio band 430, and between audio band 430 and data band 460, and between data band 460 and video band 450. Guardbands 420 are provided to eliminate undesired capacitive, inductive, or conductive coupling from channels within the allocated frequency bands, to another (e.g., cross talk).

In yet another example embodiment, CPE 100 devices are preset with frequency assignment information. However, upon configuration, frequency assignment information is updated. For example, if a CPE 100 is preconfigured to receive control signals at 15 megahertz in special application band 440, when a CPE 100 first connects to the system (not shown); CPE 100 receives frequency control information at 15 megahertz in special application band 440. FSA 310 receives demodulated 15 megahertz frequency signal to extract new frequency assignment information. CPE 100 settings are thereupon updated with frequency assignment information. By automatic or manual configuration, CPE 100 thereby adopts itself to receive and resolve signals with other CPEs 100 in the system.

Frequency assignment information is stored in log file at CPE 100 and accessed when allocating new spectrum. An entry in this file, for example, would be the allocation shown in FIG. 4: Video band 0-4.5 megahertz; Guardband 4.5-5 megahertz; Data band 5.0-6.0 megahertz; Guardband 6.0-6.5 megahertz; Audio band 6.5 to 7.0 megahertz; Guardband 7.0-7.5 megahertz; Reserved band 7.5 to 9; and Special Application band 9.0 to 20 megahertz.

In another example embodiment, an emergency information channel is preferably assigned in reserved band 410. Breaking news, weather, and national security alerts are examples of information available on an emergency information channel. Depending upon the information being transmitted the assigned bandwidth of the emergency channel may be expanded beyond reserved band 410 by FSA 310.

In yet another example embodiment, reserved band 410 also preferably includes channels designated for communication of particular protocols. Protocol specific signals include TCP/IP and a variety of other proprietary and standardized protocols. Depending upon the information transmitted, the assigned bandwidth of the protocol channels may be expanded beyond reserved band 410 by FSA 310.

In addition, FSA 310 preferably configures new frequency allocation assignments based on several factors including the physical properties of the twisted pair links. For example, signal transmissions requiring high QoS are allocated lower, more reliable, frequencies if the quality of the twisted pair link is low.

Subscriber demands for a particular service optionally effect making frequency assignments. For example, highly viewed sporting events may necessitate wider frequency band allocation for video band 450. FSA 310 may also analyze spectrum transmissions and determine if particular frequency is in greater demand. Finally, protocol specific requirements also play a factor in frequency assignments. For example, NTSC signal may require between 0 and 4.5 megahertz. FSA 310 interoperates with PA 320 to incorporate protocol specific requirements in frequency assignments. PA 320 is discussed in the following section.

Protocol Allocation Block

FSA 310 communicates with PA 320 to assign the industry standard or custom protocols. PA 320 stores signaling rules used to convey information between CPEs 100. Signaling rules include, for example, format and relative timing of signal exchange between CPEs 100. PA 320 also includes a protocol converter means for translating the protocols of a received signal to a new protocol for transmission in the dynamically allocated frequency spectrum. This allows CPEs 100 to transmit and receive spectrum using newly or dynamically selected protocols. The protocol allocation block also enables CPE 100 to transmit and receive properly formatted digital signals between CPE 100 and peer entities of LAN 240 or WAN 230. A preferred type of protocol supported by this submodule is traditional Internet Protocol. Other types of protocols, including proprietary protocols, are employed as well.

PA 320 computes an efficient arrangement of protocol channels. By multiplexer 220, as shown in FIG. 2, one or more signals are combined into a single channel with different frequency transmission band settings. For example, NTSC, IP Data, and POTS may be arranged and multiplexed on a common twisted pair wire each having different spectrum allocation settings and protocol sequencing. PA 320 includes signaling rules established by control signals, preconfigured settings, or CGI 330. CGI 330 is discussed in the following section.

Graphical Configuration Interface 330

GCI 330 is displayed on a video monitor of a digital processing machine and is adopted to receive input from a user and/or administrator. GCI 330 is a submodule of FMM 300. GCI 330 provides means for a user and/or an administrator to assign and set the various protocols and frequency assignments. GCI 330 also enables users and administrator to input protocol requirements and available or unused spectrum information.

GCI 330 also enables users to populate FSA 310 with QoS requirements for signal transmission. FSA 310 updates QoS requirements automatically or selectively so as to provide strategic allocation of frequency bands to satisfy a particular QoS. Some examples of selectively applied QoS requirements are based upon known standards, such as those provided for TCP/IP including variable bit rates and constant bit rates. Another example of known standards are those provided by IEEE 802.11 (e.g., Wi-Fi), developed by working group 11 of the IEEE LAN/MAN Standards Committee (IEEE 802). Once populated, FSA 310 selectively employs the specified QoS requirements when allocating frequency spectrum.

Users may also selectively populate QoS requirements based upon system objectives. For example, assume an object of the system is to provide less than a two percent rate of signal loss for a particular service category. Further assume that such service is allocated a channel from 5 megahertz to 7 megahertz. Assuming further that lower frequencies translate to improved signal strength, when FSA 310 observes degradation in the signal resulting in greater than two percent data loss, then FSA 310 reallocates the service in a frequency ranging from 5 megahertz to 6 megahertz. Alternatively, if a specific harmonic causes crosstalk in a channel, FSA 310 reallocates the channel in a higher frequency.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A communications device comprising:
   a. at least one transmitter positioned to transmit signals in an analog format over an assigned frequency spectrum on a twisted pair link;
   b. at least one receiver positioned to receive signals in an analog format over an assigned frequency spectrum on said twisted pair link;
   c. at least one compensator positioned to correct degradation associated with said twisted pair links coupled to said transmitter or said receiver; and
   d. at least one frequency management module coupled to said transmitter or said receiver and positioned to allocate frequency spectrums for transmission and reception of communication signals over said twisted pair links.

2. A communications device as defined in claim 1, wherein said communications device comprises a client device and said frequency management module being responsive to signals received from a server device.

3. A communications device as defined in claim 1, wherein said communications device comprises a server device that receives and controls a remote client device.

4. A communications device as defined in claim 3, wherein said frequency management module reserves at least one frequency bandwidth for the exchange of control signals.

5. A communications device as defined in claim 1, wherein said communication signal comprises video, data, audio, reserved, guardbands or special applications.

6. A communications device as defined in claim 1, wherein said communication signal comprises an information signal simultaneously broadcast across a plurality of frequency bandwidths.

7. A communications device as defined in claim 1, further comprising at least one converter coupled to said compensator and positioned to receive a corrected analog signal and convert said corrected analog signal into a digital format.

8. A communications devices as defined in claim 1, further comprising at least one converter coupled to said compensator and position to receive a digital signal and convert said digital signal into a corrected analog signal format.

9. A communications device comprising:
   a. at least one transmitter for transmitting signals in a digital format over a twisted pair link;
   b. at least one receiver for receiving signals in an analog format over a second twisted pair link;
   c. at least one compensator for correcting degradation associated with said second twisted pair link coupled to said receiver; and
   d. at least one frequency management module coupled to said transmitter or said receiver, wherein said frequency management module manages frequency spectrums for communication signals over twisted pair links.

10. A communications device as defined in claim 9, further comprising a second transmitter for transmitting signals over twisted pair link and a second receiver for receiving communication signals over an assigned frequency spectrum on said second twisted pair link, wherein said second transmitter and said second receiver are remote from said first receiver.

11. A communications device as defined in claim 9, further comprising a second compensator for correcting degradation associated with a twisted pair coupled to said second receiver, and a second frequency management module coupled to said second transmitter or said second receiver, wherein said second frequency management module receives or transmits signals over said twisted pair links and allocates frequency spectrums for transmission and reception of signals.

12. A communications device as defined in claim 9, further comprising at least one converter coupled to said compensator, wherein said converter receives a corrected analog signal and converts said corrected analog signal into a digital format, or said converter receives a digital signal and converts said digital signal into a corrected analog signal format.

13. A communications device comprising:
   a. at least one transmitter for transmitting signals in an analog format over a twisted pair link;
   b. at least one receiver for receiving signals in a digital format over a twisted pair link;
   c. at least one compensator for correcting degradation associated with said twisted pair link coupled to said transmitter; and
   d. a frequency management module coupled to said transmitter or said receiver, wherein said frequency management module allocates frequency spectrums for transmission of communication signals over a twisted pair link.

14. A communications device as defined in claim 13, further comprising a second transmitter for transmitting communication signals over an assigned frequency spectrum over said twisted pair link, and a second receiver for receiving signals over said second twisted pair link, wherein said second transmitter and said second receiver are remote from said first transmitter.

15. A communications device as defined in claim 13, further comprising a second compensator for correcting signal degradation associated with said twisted pair coupled to said second transmitter, and a second frequency management module coupled to said second transmitter or said second receiver, wherein said second frequency management manages frequency spectrums for transmission and reception of communication signals.

16. A communications device as defined in claim 13, further comprising at least one converter coupled to said compensator, wherein said converter receives a corrected analog signal and converts said corrected analog signal into a digital format, or said converter receives a digital signal and converts said digital signal into a corrected analog signal format.

17. A communications device comprising:
   a. at least one transmitter for transmitting signals in an digital format over a twisted pair link;
   b. at least one receiver for receiving signals in digital format over a twisted pair link; and
   c. at least one frequency management module coupled to said transmitter or said receiver, wherein said frequency management module manages reception and transmission of signals over said twisted pair links.

18. The communications device of claim 16, further comprising a second transmitter for transmitting signals over said twisted pair link, and a second receiver for receiving signals over said second twisted pair link, wherein said second transmitter and said second receiver are remote from said first transmitter and said first receiver.

19. A communications device comprising:
   a. at least one transceiver for transmitting and receiving signals over an assigned frequency spectrum of a twisted pair links;
   b. at least one compensator coupled to said transceiver for correcting degradation associated with said twisted pair links; and
   c. at least one converter coupled to said compensator, wherein said converter receives a corrected analog signal and converts said corrected analog signal into a digital format, or said converter receives a digital signal and converts said digital signal into a corrected analog signal format.

20. The communications device of claim 18, further comprising at least one frequency management module coupled to said transceiver, wherein said frequency management module manages spectrum used by said transceiver.

21. The communications device of claim 19, wherein said frequency management module allocates said spectrum.

* * * * *